Jan. 31, 1939.  L. SAIVES  2,145,373
HYDRAULIC SERVO-BRAKE FOR MOTOR VEHICLES
Filed June 29, 1937
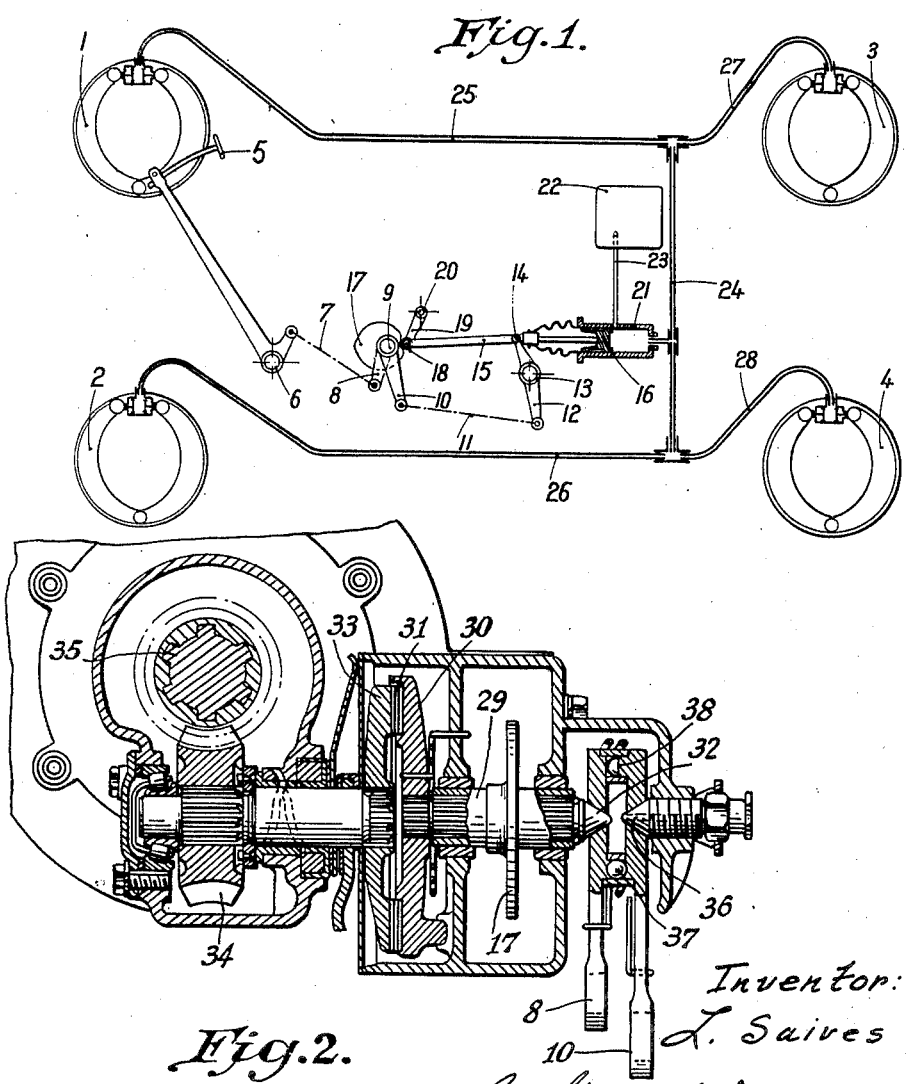

Patented Jan. 31, 1939

2,145,373

UNITED STATES PATENT OFFICE 2,145,373

HYDRAULIC SERVO-BRAKE FOR MOTOR VEHICLES

Léon Saives, Billancourt, France, assignor to Louis Renault, Billancourt, France Application June 29, 1937, Serial No. 151,044
In France April 16, 1937

2 Claims. (Cl. 188—140)

The present invention relates to a hydraulic servo-brake for motor vehicles, which is essentially characterized by the combination of a mechanical drive with servo-motor, and of hydraulic transmission system adapted to impart the braking force to the brake shoes. This servo-brake enables the use of any type of mechanical drive with servo-motor, while having the advantage of an exact distribution of the braking force among all of the braked wheels, by the use of the hydraulic transmission system.

The device for mechanical drive with servo-motor may, in particular, be analogous to the devices set forth in United States Patent No. 1,742,788 and in the French Patent No. 817,805, of the same applicant, dated May 31, 1937, except that the drive, instead of acting upon mechanical transmission gear, acts upon the piston of a hydraulic transmission.

The accompanying drawing shows, by way of example, an embodiment of the invention.

Figure 1 diagrammatically illustrates the hydraulic system for the brakes of a vehicle including the brake actuating means.

Figure 2 is a detailed view partly in section and partly in elevation illustrating the mounting of the brake actuating levers and means for applying power resulting from the motion of the vehicle to the brake actuating means.

It is supposed that the invention is applied to the braking of the four wheels of a motor vehicle, and the brakes of these four wheels are respectively indicated at 1, 2, 3 and 4.

The mechanical drive is actuated by a pedal 5, which is operated by the driver. This pedal, which is mounted on an axle 6, actuates—for instance through a cable 7—a lever 8 pivoting on the axle 9 of the servo-motor device. On the same axle is mounted a lever 10 which is connected—for instance through a cable 11—to a lever 12 which is rotatable on an axle 13 and is connected at 14 to the rod 15 of a piston 16 pertaining to the hydraulic transmission.

The levers 8 and 10 are so constructed and mounted that the rotation of the lever 8 with reference to the lever 10 will throw on a clutch whose driving part is actuated, for instance, by the transmission gear of the vehicle, whilst the driven part operates a cam 17, according to an arrangement which has been already set forth in the French Patent No. 817,805. This device is shown in Figure 2. The cam 17 is mounted on a shaft 29 which may slide axially and carries at one of its ends the driven part 30 of the clutch 31 and at the opposite end a conical part 32 on which is freely mounted the lever 8 in such a manner as to be able to rotate with respect to the shaft 29. The driving part 33 of the clutch is operated through a gear 34 by a shaft 35 connected to a member of the transmission of the vehicle rotating with the wheels. The lever 10 is freely mounted on a stationary member having a conical end part 36 aligned with the axis of the conical part 32. Between the two hubs of the levers 8 and 10 are provided for example balls 37 acting on annular rolling races of the hubs and these races include cam parts 38 arranged in such a manner as to move the hubs axially away from each other and thus cause axial sliding of the shaft 29 and the engagement of the clutch 31 when the lever 8 is rotated with respect to the lever 10.

When the members 33, 34, 35 are not in motion or when the vehicle is stopped, the clutch 31 serves only as a fulcrum or support for limiting the axial spacing of levers 8 and 10 which are then rotated one operating the other through the balls 37 acting on cams 38. When the members 33, 34, 35 are in motion the driven part 30 of the clutch rotates the shaft 29 and the cam 17 when the clutch is engaged by axial displacement of the shaft 29. The cam 17 acts upon a roller 18 mounted on the end of the rod 15, and its outline is such that it will have the same action irrespectively of the direction of rotation, starting from its initial position. The roller 18 may be guided by a crank 19 turning about a stationary axle 20.

The hydraulic transmission comprises a cylinder 21 in which the piston 16 is movable and which communicates, in the releasing position of the piston, with the tank 22 containing liquid, through a pipe 23, whilst the end of the cylinder communicates, through a pipe 24, with pipes 25, 26, 27 and 28, leading respectively to the devices controlling the brake shoes 1, 2, 3 and 4.

The mechanical drive with servo-motor acts upon the rod 15, as disclosed in the above-mentioned patent of May 31, 1937, and this rod acts in turn—through the piston 16—upon the hydraulic transmission.

I claim:

1. In brake operating apparatus for a vehicle, a hydraulic brake system including a cylinder having a piston mounted therein adapted upon movement to establish fluid pressure in the system, a rotatable clutch member having a shaft extending therefrom, a cam carried by said shaft and means associated therewith adapted to move the piston upon rotation of the shaft, a pedal operated lever mounted to turn on said shaft, a second lever pivotably mounted adjacent said first mentioned lever, means connecting the free end of said second lever with the piston, and means interposed between said levers adapted to move the clutch member to a clutch-engaging position upon the initial movement of one lever with respect to the other and thereafter establish connection of the levers.

2. In a brake operating apparatus for a vehicle, a hydraulic brake system including a cylinder having a piston mounted therein adapted upon movement to establish fluid pressure in the system, a rotatable clutch member having a shaft fixed thereto, a cam carried by said shaft, a rod extending from said piston so as to be engaged by said cam, a pedal operated lever mounted to turn on said shaft, a second lever pivotably mounted adjacent the end of said shaft so that the hub portion of each lever lies adjacent each other, means connecting the free end of said second lever with the piston, and means interposed between the hubs of said levers adapted to axially move the shaft and the clutch member to a clutch-engaging position upon initial movement of the pedal operated lever with respect to the second lever and thereafter establish a driving connection between the levers.

LÉON SAIVES.